United States Patent
Chang et al.

(10) Patent No.: US 10,212,741 B2
(45) Date of Patent: Feb. 19, 2019

(54) HETEROGENEOUS DEVICE MANAGEMENT IN MACHINE TO MACHINE AREA NETWORK

(71) Applicant: KT CORPORATION, Gyeonggi-do (KR)

(72) Inventors: Deok-Moon Chang, Seoul (KR); Seung-Kwon Lee, Gyeonggi-do (KR); Yeong-Hwan Jeong, Seoul (KR); Woo-Hyuk Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 295 days.

(21) Appl. No.: 14/190,938

(22) Filed: Feb. 26, 2014

(65) Prior Publication Data

US 2014/0242983 A1 Aug. 28, 2014

(30) Foreign Application Priority Data

Feb. 26, 2013 (KR) .................. 10-2013-0020295

(51) Int. Cl.
*H04W 4/70* (2018.01)
*H04W 76/14* (2018.01)

(52) U.S. Cl.
CPC ............ *H04W 76/14* (2018.02); *H04W 4/70* (2018.02)

(58) Field of Classification Search
CPC ....... H04W 4/005; H04W 4/08; H04W 4/008; H04W 4/006; H04W 48/16; H04W 28/0215; H04W 8/005; H04W 92/18; H04W 60/06; H04W 76/04; H04W 84/18; H04W 88/04

See application file for complete search history.

(56) References Cited

U.S. PATENT DOCUMENTS

| | | | |
|---|---|---|---|
| 2005/0037753 A1* | 2/2005 | Andersen | H04W 48/18 455/435.2 |
| 2006/0238797 A1 | 10/2006 | Berglin | |
| 2010/0304737 A1 | 12/2010 | Jain et al. | |
| 2011/0047266 A1 | 2/2011 | Yu et al. | |
| 2012/0147417 A1 | 6/2012 | Berglin | |
| 2013/0003107 A1 | 1/2013 | Berglin | |
| 2013/0003127 A1 | 1/2013 | Berglin | |
| 2013/0046841 A1* | 2/2013 | Park et al. | 709/206 |
| 2015/0031353 A1* | 1/2015 | Hakola | H04W 48/16 455/422.1 |

FOREIGN PATENT DOCUMENTS

| | | |
|---|---|---|
| KR | 10-2005-0083840 A | 8/2005 |
| KR | 10-2011-0020137 A | 3/2011 |
| KR | 10-2011-0087372 A | 8/2011 |
| KR | 10-2011-0091070 A | 8/2011 |
| KR | 10-2012-0012974 A | 2/2012 |
| KR | 10-2012-0050652 A | 5/2012 |

* cited by examiner

*Primary Examiner* — Christopher M Brandt
(74) *Attorney, Agent, or Firm* — IP Legal Services, LLC

(57) ABSTRACT

The present disclosure is related to managing heterogeneous M2M devices in a machine to machine (M2M) area network. Particularly, the present disclosure relates to supporting heterogeneous M2M devices (i.e., M2M devices not being supported in an M2M gateway) by employing a variety of network interfaces of other M2M devices in an M2M area network.

11 Claims, 8 Drawing Sheets

HETEROGENEOUS DEVICE MANAGEMENT IN MACHINE TO MACHINE AREA NETWORK

CROSS REFERENCE TO PRIOR APPLICATIONS

The present application claims priority under 35 U.S.C. § 119 to Korean Patent Application No. 10-2013-0020295 (filed on Feb. 26, 2013), which is hereby incorporated by reference in its entirety.

TECHNICAL FIELD

The present disclosure relates to managing heterogeneous M2M devices in a machine to machine (M2M) area network, in particular, to supporting heterogeneous M2M devices by employing a variety of network interfaces of other M2M devices in an M2M area network.

BACKGROUND

Machine to machine (M2M) communication may be variously referred to as a machine type communication (MTC), Internet of things (IoT), a smart device communication (SDC), or a machine oriented communication (MOC). The M2M communication refers to any communication scheme which does not require human intervention in the process of communication. Meanwhile, in the M2M communication, communication patterns may differ according to markets or applications to be applied and/or corresponding services to be used. Particularly, the M2M communication may not require that a communication connection is always established. Furthermore, information or data associated with the M2M communication may be transmitted or received with or without a constant pattern. In the M2M communication having the above-described characteristics, a networking operation may be required to be efficiently performed according to (i) characteristics of a corresponding M2M entity and/or (ii) characteristics of functions (or capabilities) provided by the corresponding M2M entity.

Various M2M devices to which new M2M area network technologies such as WiFi, P2P, Zigbee and/or Bluetooth are applied (i.e., M2M devices having various network interfaces) have been developed. Typically, when an existing M2M gateway cannot support new interfaces of the various M2M devices, it may be necessary to install and operate separate M2M gateways. However, in this case, additional cost may be involved in association with the installation of separate M2M gateways. Furthermore, it may be required to additionally implement interfaces for interworking among a plurality of M2M gateways.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, heterogeneous M2M devices not being supported in an M2M gateway may be efficiently supported by employing network interfaces of other M2M devices in an M2M area network.

In accordance with at least one embodiment, a method may be provided for performing a device attachment in a new machine to machine (M2M) device to be attached to an M2M area network. The method may include searching for a connectable different M2M device, when a new M2M device is not connectable to an M2M gateway, transmitting an attachment request to a searched connectable different M2M device, performing a connection of the new M2M device and the searched connectable different M2M device, and performing a communication between the new M2M device and the M2M gateway, through the connected different M2M device.

The searching may be performed based on network interface information received from one or more different M2M devices.

The network interface information may be received through beacon signals transmitted by the one or more different M2M devices.

The communication between the new M2M device and the M2M gateway may be performed through an activated device relay proxy (DRP) function of the connected different M2M device.

The searched connectable different M2M device may include a first network interface capable of interworking with a network interface of the new M2M device, and a second network interface capable of interworking with a network interface of the gateway M2M device.

The performing the connection may include transmitting device information associated with the new M2M device, to the searched connectable different M2M device.

In accordance with another embodiment, a method may be provided for performing a device attachment in a machine to machine (M2M) relay device coupled to an M2M gateway, in an M2M area network. The method may include transmitting network interface information to neighboring M2M devices, receiving an attachment request from a new M2M device, performing a device to device (D2D) connection between the relay M2M device and the new M2M device, an performing an interface connection (i) between the relay M2M device and the new M2M device and (ii) between the relay M2M network and the M2M gateway.

The transmitting may include broadcasting the network interface information through a beacon signal.

The network interface information may include information on at least one of a first network interface capable of interworking with a network interface of the new M2M device, and a second network interface capable of interworking with a network interface of the gateway M2M device.

The method may further include receiving device information from the new M2M device.

The performing the interface connection may include activating a device relay proxy (DRP) function.

In accordance with still another embodiment, a method may be provided for performing a device detachment in a machine to machine (M2M) area network. The method may receiving a detachment request from an M2M device, and performing the device detachment based on whether the M2M device has at least one of a child node and a sibling node.

The performing may include determining whether the M2M device has at least one of the child node and the sibling node, and performing at least one of (i) deactivation of a corresponding device relay proxy (DRP) function, (ii) a connection release of the M2M device, and (iii) a connection of the child node to the sibling node, according to a determination result.

The performing the at least one may include deleting device information associated with the M2M device in a case that the connection release of the M2M device is performed.

In a case that the M2M device is a last leaf node, the performing the device detachment may include deactivating a corresponding DRP function, and performing a connection release of the M2M device.

In a case that the M2M device is a leaf node having the sibling node, the performing the device detachment may include maintaining the corresponding DRP function, and performing a connection release of the M2M device.

In a case that the M2M device has a child node and does not have a connectable sibling node, the performing the device detachment may include at least one of discarding the detachment request, and transmitting a notification to at least one of user equipment, an M2M network operator server, and an M2M service provider server.

The notification includes information on the child node to be disconnected according to a connection release of the M2M device.

In a case that the M2M device has a child node and a connectable sibling node, the performing the device detachment may include connecting the child node to the connectable sibling node, activating a DRP function of the connectable sibling node, and performing a connection release of the M2M device.

The connectable sibling node may include a DRP function.

BRIEF DESCRIPTION OF THE DRAWINGS

The above and/or other aspects of some embodiments of the present invention will become apparent and more readily appreciated from the following description of embodiments, taken in conjunction with the accompanying drawings, of which.

DETAILED DESCRIPTION OF EMBODIMENTS

Figure 1:
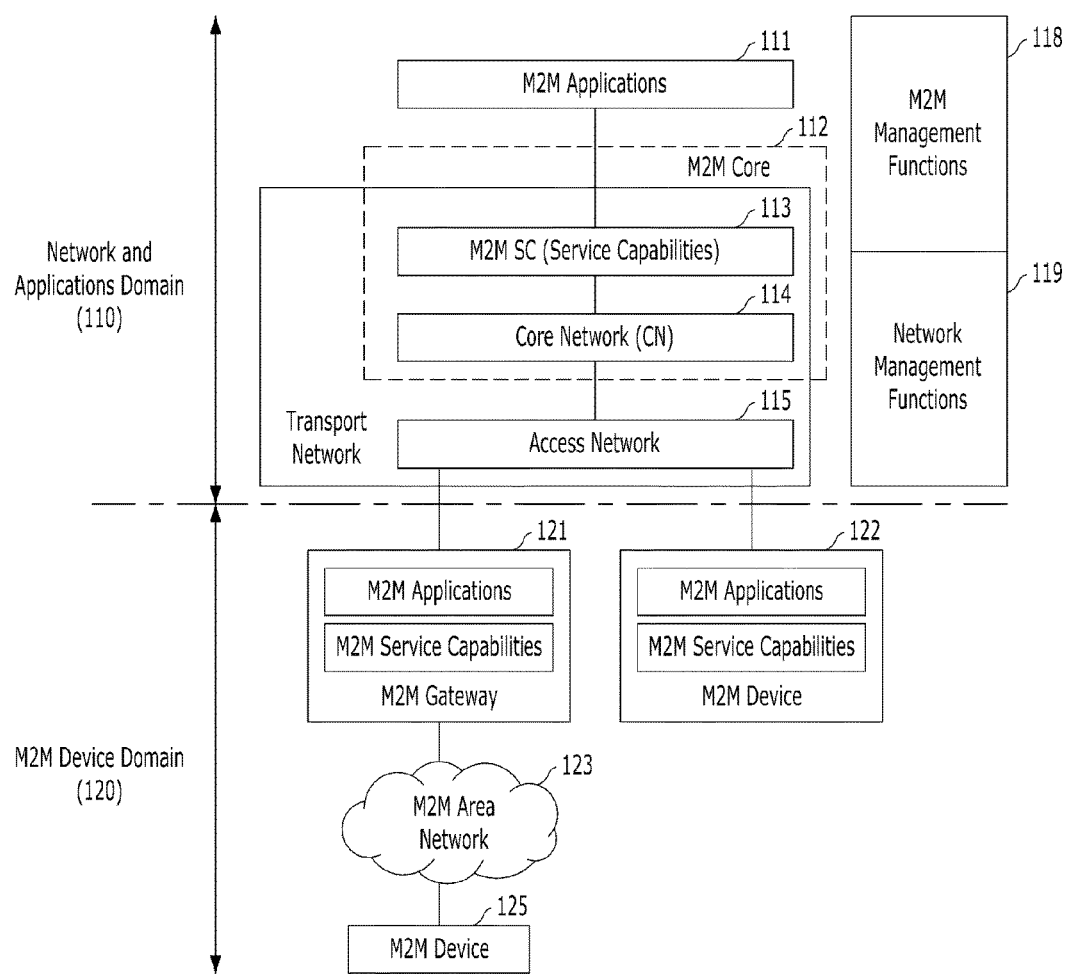
FIG. 1 is a diagram illustrating a structure of an M2M system.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

The present embodiment may manage heterogeneous M2M devices in a machine to machine (M2M) area network. Particularly, heterogeneous M2M devices not being supported in an M2M gateway may be efficiently supported by employing a variety of network interfaces of other M2M devices in an M2M area network.

FIG. 1 is a diagram illustrating a structure of an M2M system. In other words, FIG. 1 illustrates an M2M service environment.

As shown in FIG. 1, M2M system may include 'network and application domain' (hereinafter referred to as "network/application domain") 110 and M2M device domain 120.

More specifically, network/application domain 110 may include M2M applications 111, M2M core 112, access network 115, M2M management functions 118, and network management functions 119. Herein, M2M applications 111 may be accessed by M2M service capabilities (SCs) 113 corresponding to M2M service functions, and provide service logics. M2M core 112 may include core network (CN) 114 and M2M service capabilities (SCs) 113. Herein, M2M core 112 may be referred to as "an M2M platform," or "a central server." M2M service capabilities (SCs) 113 in network/application domain 110 may provide functions that are to be shared by different applications, and environments that allow access to other service capabilities through open interfaces. The use of such M2M service capabilities 113 may make it possible to develop and deploy optimized applications without considering characteristics of lower network layers. Core network (CN) 114 may provide an IP connectivity, an access network control, network/service control functions, an interconnection with other networks, roaming functions, and so forth. For example, core network 114 may include 3GPP CN, ETSI TISPAN CN, 3GPP2 CN, and/or IMS, but is not limited thereto.

Access network 115 may allow M2M device 122 and/or M2M gateway 121 to communicate with core network (CN) 114. For example, access network 115 may include xDSL, HFC, FTTH, PLC, satellite, GERAN, UTRAN, eUTRAN, Wireless LAN, and/or WiMAX (WiBro), but is not limited thereto.

Meanwhile, M2M device domain 120 may include M2M gateway 121, M2M devices 122 and 125, and M2M area network 123. Herein, M2M devices 122 and 125 may be devices which run M2M application(s) using M2M service capabilities (SCs) and functions of the network domain. M2M devices 122 and 125 may be classified into (i) M2M device 122 including M2M applications and M2M service capabilities (SCs), and (ii) M2M device 125 not including M2M applications and M2M service capabilities (SCs).

M2M gateway 121 may include M2M service capabilities (SCs), and enable M2M devices (e.g., 122, 125) to perform operations (e.g., interworking and interconnection) in network/application domain 110. Particularly, M2M gateway 121 may communicate with M2M device 125, through a variety of M2M area networks (e.g., 123).

Service capabilities (SCs) may provide functions which are to be shared by different applications. Each of M2M core 112, M2M gateway 121, and M2M device 122 may include a specific service capability (SC).

According to the ETSI standard, M2M service capabilities 113 in network/application domain 110 may be referred to as a network service capabilities layer (NSCL). M2M service capabilities in M2M gateway 121 may be referred to as a gateway service capabilities layer (GSCL). M2M service capabilities in M2M device 122 may be referred to as a device service capabilities layer (DSCL). The NSCL, the GSCL, and the DSCL may be collectively referred to as a service capabilities layer (SCL).

In the structure shown in FIG. 1, M2M gateway 121 and M2M devices 122 and 125 may communicate with M2M core 112, or an M2M platform combining M2M service capabilities (SCs) of M2M core 112. M2M core 112 or the M2M platform may manage M2M gateway 121 and M2M device 122 and 125 positioned in a lower layer.

Meanwhile, in order to provide an M2M service shown in FIG. 1, M2M gateway 121 and M2M devices 122 and 125 may connect to one or more access networks (e.g., 115). In other words, M2M entities may connect to an access network(s) through one or more network access devices. Access network 115 may be at least one of a CDMA/WCDMA network, a GSM/GPRS network, a WiFi network, and a WiMax network. Accordingly, the M2M entities basically use mobile communication networks based on CDMA/WCDMA or GSM/GPRS, and may access a WiFi network or a WiMax network according to a network situation.

An M2M device/gateway having a plurality of network interfaces (e.g., WCDMA, WiFi, WiMax, and so forth) may perform a connection to an M2M access network.

M2M core 112 may perform M2M management functions 118 and/or network management functions 119. More specifically, M2M management functions 118 may include all the functions required to manage M2M service capabilities in network/application domain 110. For example, M2M core 112 may perform M2M management functions 118 in order to control M2M gateway 121 and/or M2M devices 122 and 125 included in M2M device domain 120, and to collect M2M data from M2M gateway 121 and/or M2M devices 122 and 125, in connection with an M2M service.

Network management functions 119 may include all the functions required to manage access network 115 and core network 114. Network management functions 119 may include a variety of functions such as a provisioning, a supervision, a fault management, and so forth.

Furthermore, M2M devices 122 and 125 installed in M2M device domain 120 include various devices for acquiring information on surrounding conditions according to various monitoring purposes of M2M services. Examples of such surrounding conditions may include an outbreak of fire, trespassing, observation of the elder or children, security of private lands, shop monitoring, and a variety of facility monitoring. For example, M2M devices 122 and 125 may include a camera, a motion sensor, a temperature sensor, a humidity sensor, a wind direction sensor, a gyro sensor, and an acceleration sensor. In a case of health-care services, M2M devices 122 and 125 may include devices for monitoring health information. Examples of such M2M devices 122 and 125 may include a sphygmomanometer, a thermometer, and a cardiotachometer. M2M devices 122 and 125 may include various electronic devices for home networks.

Figure 2:
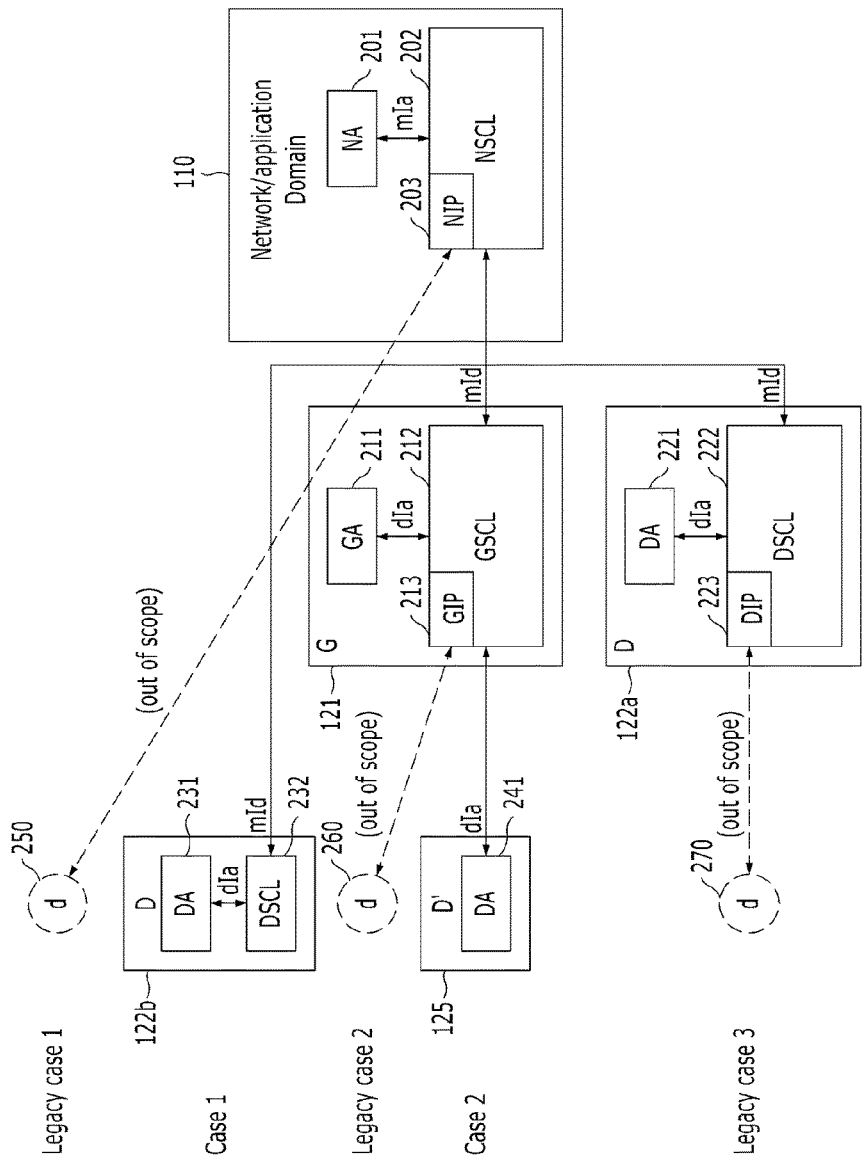
FIG. 2 illustrates functional elements and an interface configuration in an M2M system.

FIG. 2 illustrates functional elements and an interface configuration in an M2M system. Furthermore, FIG. 2 illustrates the mapping of reference points to different deployment scenarios.

As shown in FIG. 2, M2M core 112 of network/application domain 110 communicates with M2M devices (hereinafter referred to as D or D') 122 and 125 or M2M gateway (G) 121 through access network 115 and core network 114. Network/application domain 110 may include network application (NA) 201 and network service capability layer (NSCL) 202. NSCL 202 may correspond to a set of service functions necessary for M2M communication in network/application domain 110. NSCL 202 may have network interworking proxy (NIP) function 203 for interworking with legacy device 250.

Various M2M devices (D, D') 122a, 122b and 125 (e.g., sensors), and M2M gateway (hereinafter referred to as G) 121 may be included in M2M device domain 120. M2M gateway (G) 121 may include gateway application (GA) 211 and gateway service capability layer (GSCL) 212 for supporting services. GSCL 212 may correspond to a set of service functions necessary for M2M communication in M2M gateway 121. Gateway interworking proxy (GIP) function 213 for supporting legacy device 260 may be included in GSCL 212. M2M devices (D) 122a and 122b may include device service capability layers (DSCLs) 222 and 232 and device applications (DAs) 221 and 231 that support services. M2M device (D') 125 may include only DA 241 but not include a DSCL. DSCLs 222 and 232 may correspond to a set of service functions required for M2M communication in M2M devices 122a and 122b. In particular, M2M device 122a supporting device interworking proxy (DIP) function 223 may have a function of interworking with legacy device 270. All M2M devices 122a, 122b and 125 other than legacy devices (d) 250, 260, and 270 may commonly have device application (DA). Meanwhile, legacy devices (d) 250, 260, and 270 may refer to a device that cannot interwork in accordance with the common M2M communication standard due to the function and configuration thereof. Legacy devices (d) 250, 260, and 270 may interwork through xIP (e.g., NIP 203, GIP 213, DIP 223, etc.) for a backward compatibility.

Service capabilities (e.g., NSCL, GSCL, DSCL) and M2M applications (e.g., NA, GA, DA) may be defined in the ETSI standard. In addition, interface between service capabilities (e.g., NSCL, GSCL, DSCL) and/or interface between service capability and M2M applications (e.g., NA, GA, DA) may be defined in the ETSI standard. For example, an "mIa" reference point may refer to an interface between NA 201 and NSCL 202. an "mId" reference point may refer to an interface between NSCL 202 and GSCL 212 or DSCLs 222 and 232. a "dIa" reference point may refer to an interface between DAs 221 and 231 and DSCLs 222 and 232, or an interface between GA 211 and GSCL 212.

In FIG. 2, D' device 125 connected through M2M gateway 121 may include a specific M2M area network interface (e.g., WiFi, Zigbee, Blutooth, etc.). D' device 125 may be connected to M2M gateway 121 through the M2M area network interface. However, when a specific network interface of a specific M2M device is not supported in M2M gateway 121, the specific M2M device may not interwork with M2M gateway 121. In particular, the specific M2M device may be not a legacy device but an M2M device to be newly developed, and the applied area network technology may have a new interface that is not supported in M2M gateway 121. The present embodiment provides a method that is capable of supporting the new M2M device.

Figure 3:
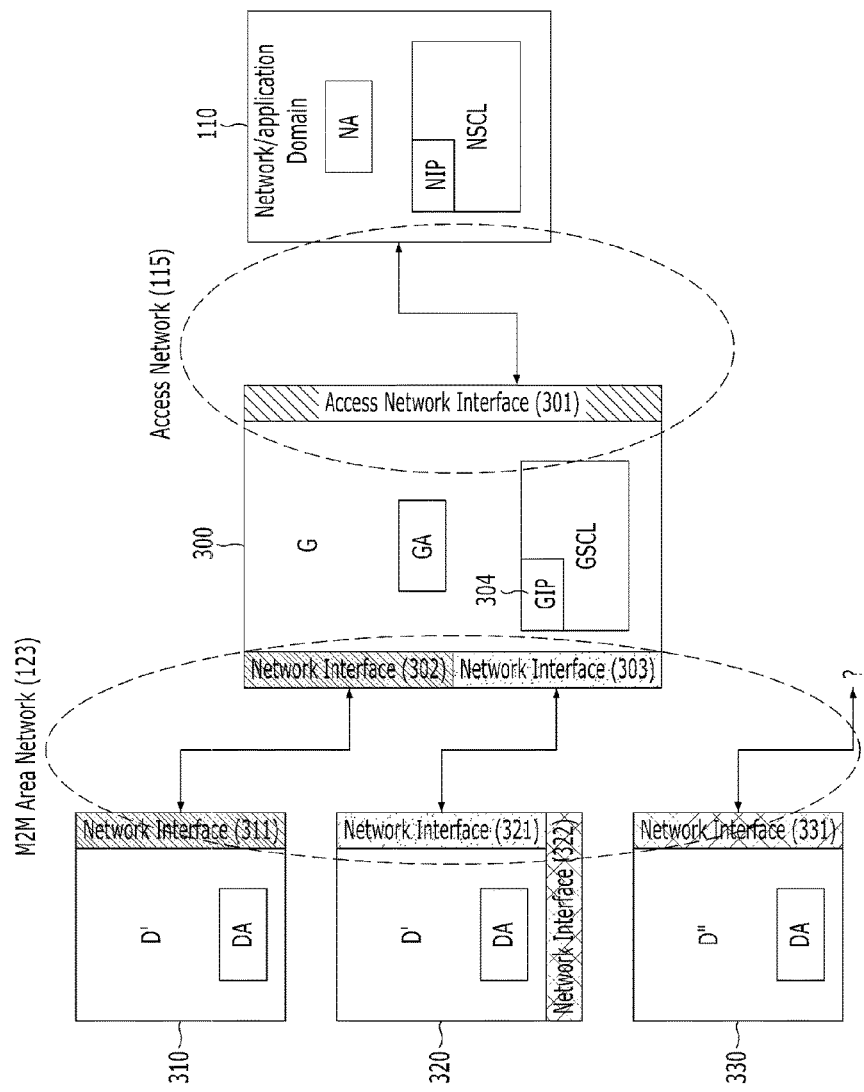
FIG. 3 illustrates a typical example of an interface configuration in an M2M system.

FIG. 3 illustrates a typical example of an interface configuration in an M2M system.

As shown in FIG. 3, in an M2M system such as a home network or a smart home, one or more M2M gateways (G) (e.g., set-top boxes) 300 and a plurality of M2M devices (D', D") 310, 320 and 330 may be connected to M2M area network 123. Herein, M2M gateway 300 may be connected to network/application domain 110 through access network 115. A data transmission and reception according to such home network architecture may be performed when an M2M device (e.g., 310, 320, or 330) is connected to an NSCL through the access network 115. In such architecture, state information and/or data of M2M devices 310, 320 and 330 may be periodically transmitted to and received from M2M core 112 of network/application domain 110 through M2M gateway 300.

Furthermore, in order to communicate between M2M entities (e.g., M2M device, M2M gateway), each of M2M gateway 300 and M2M devices 310, 320 and 330 may be required to have one or more network interfaces. In particular, M2M gateway 300 may have (i) access network interface 301 for connection with access network 115, and (ii) one or more M2M area network interfaces 302 and 303 for connection of M2M devices (e.g., 310, 320). M2M devices 310, 320 and 330 may be connected to M2M area network 123 to communicate with M2M gateway 300. M2M devices 310, 320 and 330 may have one or more network interfaces. In the case that a certain M2M device is able to match with area network interfaces 302 and 303 supported in gateway 300, the certain M2M device may be connected to M2M gateway 300.

For example, D' device 320 has two M2M area network interfaces 321 and 322. Network interface 322 represents an M2M area network interface that is not supported in M2M gateway 300. In this case, D' device 320 may be connected to M2M gateway 300 through only supported M2M area network interface 321. However, D" device 330 provides only M2M area network interface 331 that is not supported in M2M gateway 300. Therefore, D" device 330 may not be connected to M2M gateway 300, and accordingly, may not be connected to a corresponding M2M network. In the case that D" device 330 interworks through GIP 304 of M2M gateway 300 in a similar manner to the interworking of legacy devices (d) 250, 260, and 270 of FIG. 2, functions of D" device 330 may be restricted. As such, (i) M2M device 320 having a plurality of area network interfaces and (ii) M2M device 330 to which a new area network technology not supported in gateway 300 is applied may be gradually increasing. Accordingly, network matching methods and configurations therefor may be required.

Figure 4:
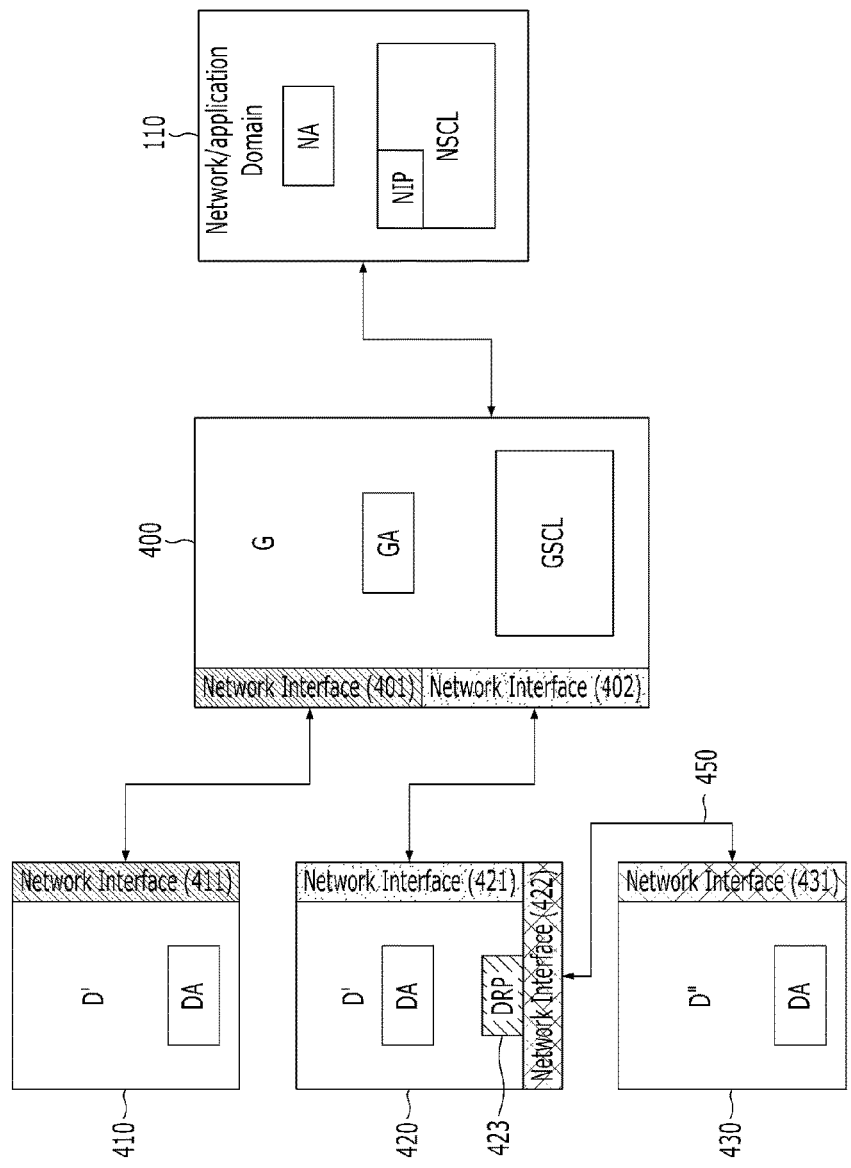
FIG. 4 illustrates an example of an interface configuration in an M2M system in accordance with at least one embodiment.

FIG. 4 illustrates an example of an interface configuration in an M2M system in accordance with at least one embodiment.

Referring to FIG. 4, M2M gateway (G) 400 may basically include a GSCL for interworking with M2M devices 410, 420 and 430 as described above with reference to FIG. 2, and may have network interfaces 401 and 402 for connection to each M2M device (e.g., 410, 420, or 430). Typically, M2M gateways may have one or more M2M area network interfaces 401 and 402. As shown in FIG. 4, it may be assumed that M2M M2M gateway 400 have two M2M area network interfaces 401 and 402. M2M Gateway 400 may be connected to M2M core 112 of network/application domain 110 through an access network (e.g., 115). Hereinafter, M2M area network interfaces (e.g., 401, 402, 411, 421, 422, 431) associated with M2M area network 123 may be simply referred to as "area network interface," "network interface," or "interface."

D' device 410 may have M2M area network interface 411 that supports interworking with M2M area network interface 401. In this case, D' device 410 may be connected to M2M gateway 400 through M2M area network interface 401.

Although D' device 420 has two M2M area network interfaces 421 and 422, only M2M area network interface 421 may support interworking with M2M area network interface 402 of M2M gateway 400. Therefore, D" 420 device may be connected to M2M area network interface 402 of M2M gateway 400 through M2M area network interface 421. In this case, M2M area network interface 422 may not be employed.

Furthermore, D' device 420 may periodically transmit a beacon to other M2 devices in a broadcasting manner, in order to indicate that M2M area network interface 422 are supported. Such beacon may be used to notify the presence of D' device 420 to other M2M devices attempting a connection (or an attachment). As described with reference to FIGS. 5 and 6, M2M area network interface 422 may perform a connection to M2M area network interface 431 of D" device 430 by using a DRP function, and relay a connection to M2M area network interface 421. Herein, the DRP function of relay M2M device (e.g., 420) may collectively represent a variety of relay functions (e.g., an interface connection, a data transfer) for communication between an attached M2M device attached (e.g., 430) and M2M gateway 400. Furthermore, the DRP function may be implemented as a separate function module (or function unit) such that the DRP function is easily or quickly activated or deactivated. Through such connection relay procedures, D" device 430 may interwork with M2M area network interface 402 of M2M gateway 400.

Meanwhile, D" device 430 may have M2M area network interface 431. However, M2M area network interface 431 may not be supported in M2M gateway 400. In this case, D" device 430 may not be directly connected to M2M gateway 400. D" device 430 may search for D" device 420 that are connectable to corresponding M2M area network interface 431, and request a connection to D' device 420.

D' device 420 may transmit a beacon such that other M2M devices (e.g., 430) can easily find M2M area network interface 422 of D' device 420. When receiving a connection request (or attachment request) from other devices (e.g., 420), D' device 420 may perform a connection ("450") between D' device 420 and D" device 430. In order to perform a connection between M2M devices, upper M2M devices (e.g., 420) may be required to have a DRP function 423.

Figure 5A:
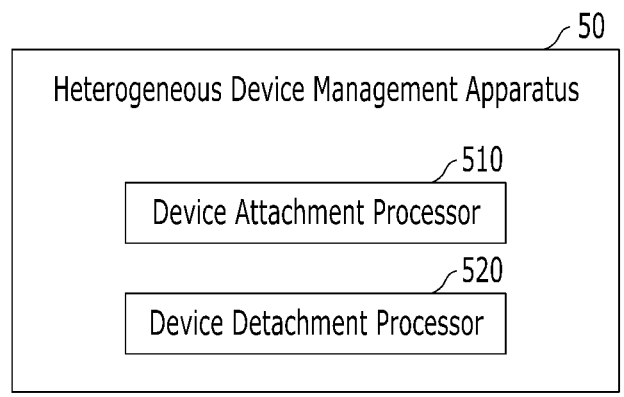
FIG. 5A is a block diagram of an apparatus for performing a heterogeneous device management in an M2M area network in accordance with at least one embodiment.

FIG. 5A is a block diagram of an apparatus (e.g., heterogeneous device management apparatus 50) for performing a heterogeneous device management in an M2M area network in accordance with at least one embodiment.

Referring to FIG. 5A, heterogeneous device management apparatus 50 in accordance with at least one embodiment may include device attachment processor 510 and device detachment processor 520. Heterogeneous device management apparatus 50 according to the present embodiment may be referred to as "a DRP apparatus" because of performing a DRP function (e.g., 423). Furthermore, heterogeneous device management apparatus 50 may be implemented in an M2M device (e.g., 420). In other embodiments, heterogeneous device management apparatus 50 may be implemented as a separate server in an M2M network.

Device attachment processor 510 of a relay M2M device may (i) transmit network interface information to neighboring M2M devices, (ii) receive an attachment request from a new M2M device, (iii) perform a connection (e.g., D2D connection) between the relay M2M device and the new M2M device, and (iv) perform an interface connection between the relay M2M device and the new M2M device and an interface connection between the relay M2M network and the M2M gateway. Device attachment processor 510 will be described in more detail with reference to FIG. 4 FIG. 5B, and FIG. 6.

Device detachment processor 520 may receive a detachment request from a specific M2M device, and perform the device detachment based on whether the M2M device has at least one of a child node and a sibling node. More specifically, device detachment processor 520 may determine whether the M2M device has at least one of the child node and the sibling node; and perform at least one of (i) deactivation of a corresponding device relay proxy (DRP) function, (ii) a connection release of the M2M device, and (iii) a connection of the child node to the sibling node, according to a determination result. Device detachment processor 510 will be described in more detail with reference to FIG. 7 and FIG. 8.

Figure 5B:
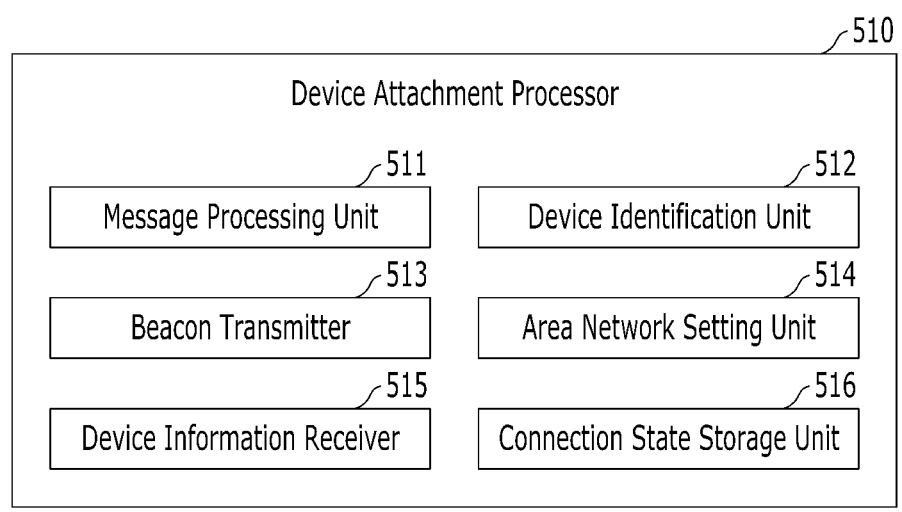
FIG. 5B is a block diagram of a device attachment processor in accordance with at least one embodiment.
Figure 6:
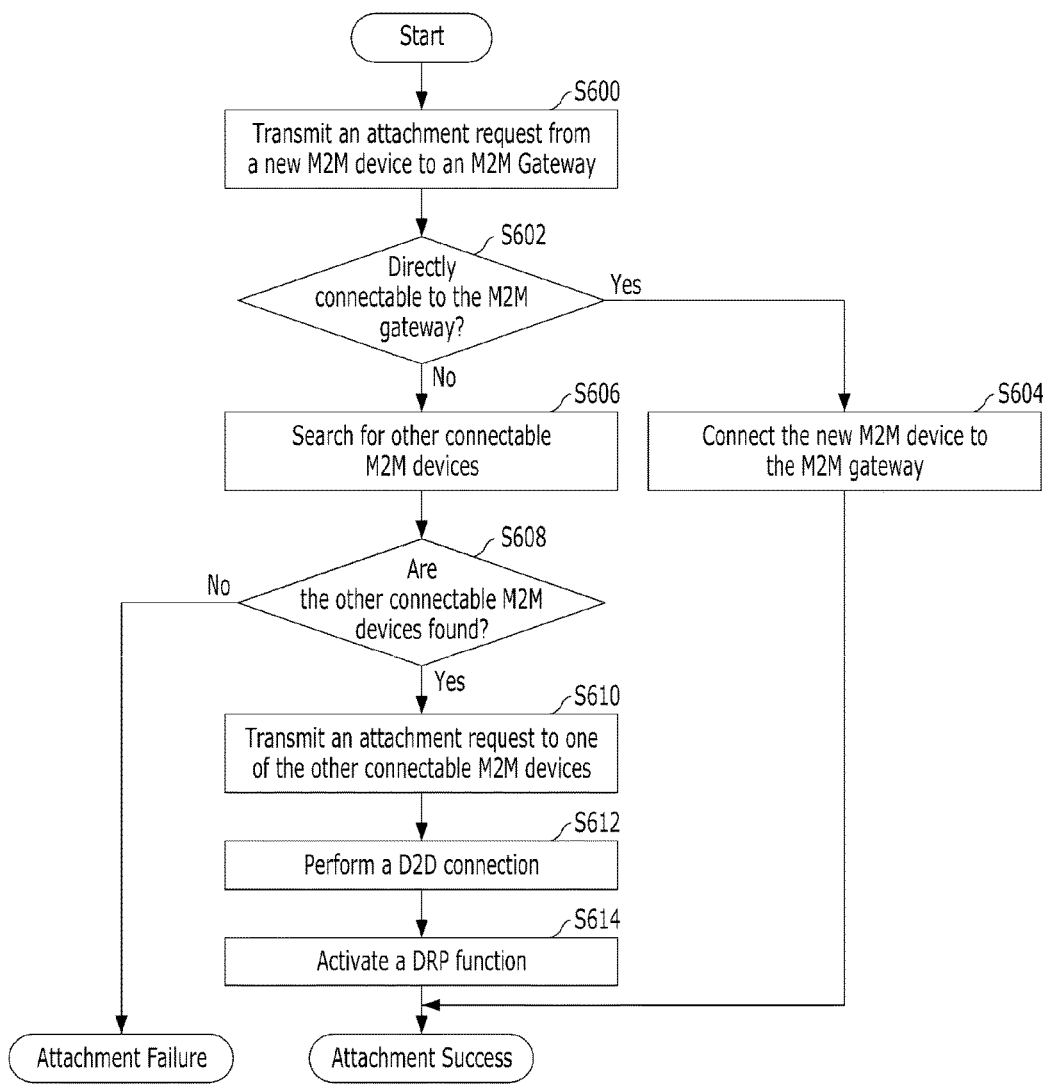
FIG. 6 is a flowchart illustrating a method of attaching a heterogeneous M2M device to an M2M area network in accordance with at least one embodiment.

FIG. 5B is a block diagram of a device attachment processor of FIG. 5A in accordance with at least one embodiment. FIG. 6 is a flowchart illustrating a method of attaching a heterogeneous M2M device to an M2M area network in accordance with at least one embodiment.

Referring to FIG. 5B, device attachment processor 510 may include one or more sub-processors such as message processing unit 511, device identification unit 512, beacon transmitter 513, area network setting unit 514, device information receiver 515, and connection state storage unit 516. Furthermore, in the case that device attachment processor 510 is implemented in an M2M device, one or more sub-processors other than sub-processors shown in FIG. 5B may be further included, according to whether the corresponding M2M device is (i) a new M2M device to be attached (e.g., 430), or (ii) a relay M2M device (e.g., 420) providing a DRP function. For example, one or more sub-processors that perform one or more processing functions associated with a reception of beacons, a reception of an attachment request, and/or a transmission/reception of device information may be included. A certain M2M device may be (i) a new M2M device to be attached (e.g., 430) or (ii) a relay M2M device (e.g., 420).

Beacon transmitter 513 of an M2M device (e.g., D' device 420) may periodically broadcast a beacon to neighboring M2M devices in order to notify the presence of relayable area network interface (e.g., 422) (hereinafter, referred to as an "extra interface"). As such, the beacon may be automatically transmitted periodically. However, in other embodiments, the beacon may be transmitted at a preset time, or may be transmitted when a command is input from a user.

At step S600, a new M2M device (e.g., D" device 430) to be attached (or connected) to an M2M area network may transmit an attachment request to M2M gateway 400. That is, M2M gateway 400 may receive the attachment request from the new M2M device (e.g., D" device 430).

At step S602, M2M gateway 400 may determine whether the new M2M device (e.g., D" device 430) can be directly connected (or attached) to 2M gateway 400. That is, M2M gateway 400 may determine whether M2M gateway 400 can support interface 431 of the new M2M device that has transmitted the attachment request.

At step S604, when the new M2M device (e.g., D" device 430) is connectable (or attachable) to M2M gateway 400 (Yes—S602), the new M2M device (e.g., D" device 430) having transmitted the attachment request may be connected to M2M gateway 400. More specifically, when M2M gateway 400 has a DRP function 423 associated with the new M2M device (e.g., D" device 430), M2M gateway 400 may perform a device attachment procedure (i.e., a device connection procedure) in response to the attachment request from D" device 430. Accordingly, in this case, the new M2M device (e.g., D" device 430) may interwork with M2M gateway 400, using its own area network interface 431.

At step S606, when the new M2M device (e.g., D" device 430) is not connectable (or attachable) to M2M gateway 400 (No—S602), the new M2M device (e.g., D" device 430) having transmitted the attachment request may search for other M2M devices to be connected (or attached) (i.e., other M2M devices capable of supporting the interface (e.g., 431) of the new M2M device having transmitted the attachment request). The new M2M device (e.g., D" device 430) may search for other connectable M2M devices by receiving the beacons transmitted from other M2M devices.

At step S616, when other connectable M2M devices are not found (No—S608), i.e., when the NEW M2M device (e.g., D" device 430) does not receive the beacons from other M2M devices (No—S608), the new M2M device (e.g., D" device 430) fails to attach to the M2M area network.

Referring back to FIG. 6, at step S610, when one or more other devices (e.g., D" device) to which the new M2M device (e.g., D" device 430) are found (Yes—S608), the new M2M device (e.g., D" device 430) may transmit an attachment request to one of the other connectable M2M devices again. Herein, the other connectable M2M devices may include (i) a network interface capable of interworking with a network interface of the new M2M device (e.g., D" device 430), and (ii) a network interface capable of interworking with a network interface of M2M gateway 400. In other words, the other connectable M2M devices may be other M2M devices enabling a communication between the new M2M device (e.g., D" device 430) and M2M gateway 400 through a rely function (e.g., a DRP function). Accordingly, The other connectable M2M devices may be simply be M2M devices capable of supporting the new M2M device (e.g., D" device 430).

More specifically, in the example of FIG. 4, D" device 430 having interface 431 unsupported in M2M gateway 400 may receive the beacon transmitted by beacon transmitter 513 of D' device 420. When the other M2M device (e.g., D' device 420) having transmitted the beacon can support the interface (e.g., 431) of the new M2M device (e.g., D" device 430) having transmitted the attachment request, the new M2M device (e.g., D" device 430) may request a connection (or an attachment) to the other M2M device (e.g., D' device 420) having transmitted the beacon. For example, when D' device 420 in FIG. 4 has a DRP function 423 for the new M2M device (e.g., D" device 430), the new M2M device (e.g., D" device 430) may transmit an attachment request to D' device 420.

At step S612, when receiving the attachment request, the other M2M device (e.g., D' device 420) may perform a connection (D2D connection) to the new M2M device (e.g., D" device 430) having transmitted the attachment request. More specifically, when receiving the attachment request from the new M2M device (e.g., D" device 430), area network setting unit 514 of D' device 420 may perform a connection to the new M2M device (e.g., D" device 430).

At step S614, when the D2D connection between the new M2M device (e.g., D" device 430) and the other connectable device (D' device 420) is established, area network setting unit 514 of D' device 420 may activate a DRP function 423. Herein, the DRP function of relay M2M device (e.g., 420) may collectively represent a variety of relay functions (e.g., an interface connection, a data transfer) for communication between an attached M2M device attached (e.g., 430) and M2M gateway 400. More specifically, area network setting unit 514 of D' device 420 may activate a DRP function 423 such that (i) area network interface 431 of D" device 430 is connected to its own interface 422, and (ii) interface 422 is connected to area network interface 402 of M2M gateway 400. Accordingly, the new M2M device (e.g., D" device 430) may be connected to area network interface 402 of M2M gateway 400 through D' device 420.

Figure 7:
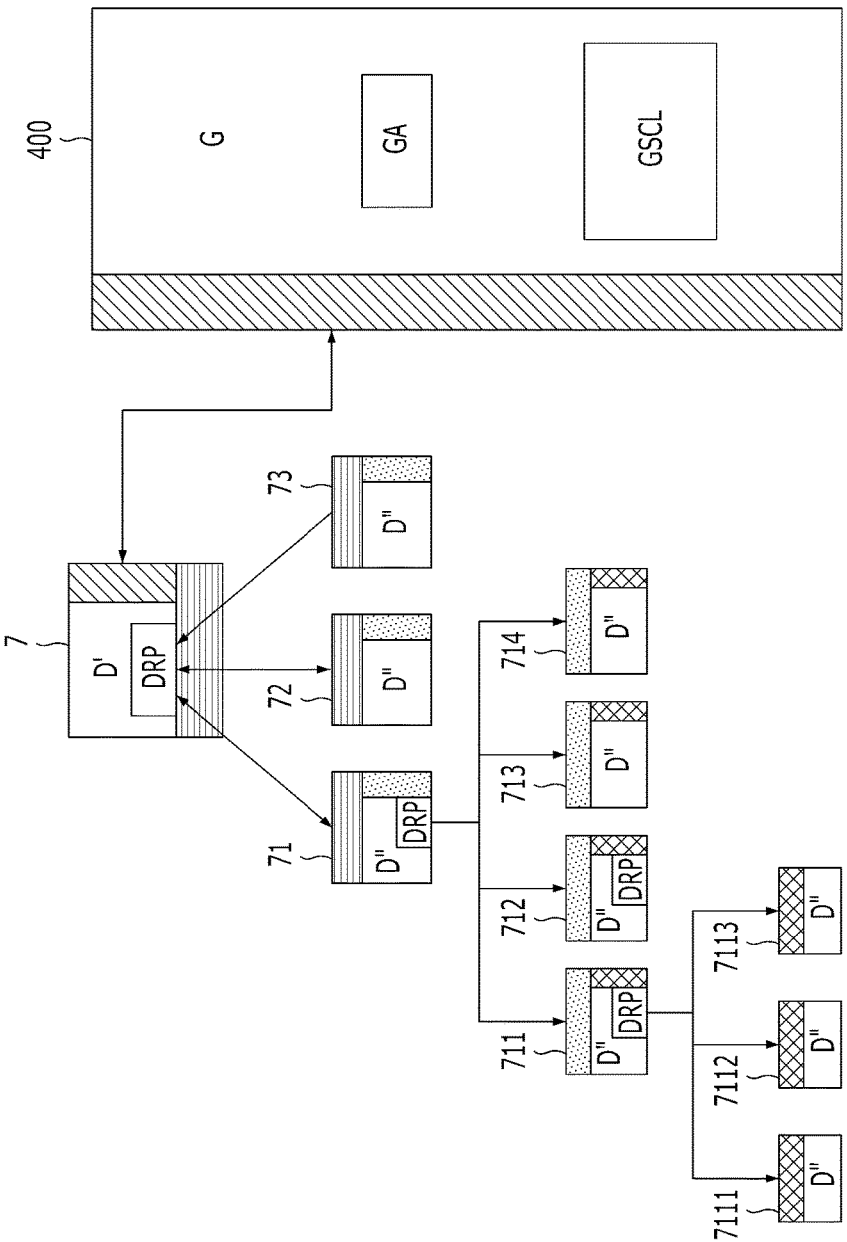
FIG. 7 illustrates a hierarchical connection between M2M devices based on a DRP function in accordance with at least one embodiment.

More specifically, area network setting unit 514 of D' device 420 may activate a DRP function 423, and request D" device 430 to send relay setting information necessary for a device relay. In response to the request of D' device 420, D" device 430 may transmit device information necessary for a relay setting. Herein, the device information may include a device identifier (ID), a media access control (MAC) address of area network interface 431, a control command, a device name, and data for a relay setting. Device information receiver 515 of D' device 420 may receive the above-described information (i.e., information transmitted by D" device 430), and store the device information received in association with the device identifier (ID) in connection state storage unit 516. As shown in FIG. 7, a plurality of M2M devices may be relayed by DRP functions. Connection state storage unit 516 may store corresponding device information (i.e., corresponding device information received from each of the M2M devices to be relayed) in association with device identifiers (IDs) of the M2M devices to be relayed. Meanwhile, D" device 430 may include one or more sub-processors that perform one or more processing functions associated with a reception of beacons, a reception of an attachment request, and/or a transmission/reception of device information.

Area network setting unit 514 of D' device 420 may perform a connection between area network interface 431 of D" device 430 and its own interface 422 in order to enable a transmission/reception of necessary data, based on the stored device information. In addition, area network setting unit 514 of D' device 420 may perform a connection setting such that its own interface 422 interworks with area network interface 402 of M2M gateway 400 through area network interface 421.

When area network setting unit 514 of D' device 420 has completed such connection setting, the control and data transmission/reception between M2M gateway 400 and D" device 430 are activated. For example, when network interface 421 receives data from area network interface 402 of M2M gateway 400, device identification unit 512 of D' device 420 may identify area network interface 431 of D" device 430 corresponding to a destination, based on device information stored in connection state storage unit 516. In this case, message processing unit 511 of D' device 420 may transmit corresponding data to area network interface 431 of D" device 430 through network interface 422. Meanwhile, when D' device 420 receives data from area network interface 431 of D" device 430 through interface 422, device identification unit 512 may identify area network interface 402 of M2M gateway 400 corresponding to a destination, based on device information stored in connection state storage unit 516. In this case, message processing unit 511 of D' device 420 may transmit corresponding data to area network interface 402 of M2M gateway 400 through network interface 421.

As described above, D' device 420 and D" device 430 may be configured similarly to a typical model of D2D in a connection mode. However, instead of direct data communication between M2M devices, a network application (NA) of network/application domain 110 may perform a data transmission/reception in connection with D" device 430, through M2M gateway 400 and D' device 420. In other words, the network application (NA) of network/application domain 110 may access D" device 430, through D' device 420. Furthermore, the network application (NA) of network/application domain 110 may transmit a common control command to all lower M2M devices of D' device 420.

In other embodiments, a device attachment method shown in FIG. 6 may be performed in a device management server or a network management server.

FIG. 7 illustrates a hierarchical connection (or hierarchical device attachment) between M2M devices based on a DRP function in accordance with at least one embodiment.

As shown in FIG. 7, a plurality of M2M devices may be attached through a DRP function of each M2M device in a hierarchical structure or a tree structure. For convenience, in a hierarchical device connection structure, an M2M device may be referred to as a "node" in terms of network. In FIG. 7, each "hatched portion" indicates a corresponding area network interface where each M2M entity (e.g., M2M device or M2M gateway) supports.

For example, as shown in FIG. 7, lower nodes 71, 72 and 73 may also interwork with M2M gateway 400 through a relay process of node 7 having an interface interworking with M2M gateway 400. Similarly, when node 7 corresponding to an upper node of lower nodes 71, 72 and 73 has a DRP function, lower nodes 711, 712, 713 and 714 may also interwork with M2M gateway 400 through node 71 and node 7. In addition, when node 71 corresponding to an upper node of lower nodes 711, 712, 713 and 714 has a DRP function, lower nodes 7111, 7112 and 7113 may also interwork with the gateway through node 711, node 71, and node 7.

In such hierarchical structure, a leaf node (e.g., 72,73, etc.) of each step is a node of which a DRP function is not activated. In other words, a leaf node may refer to a node having no child node or lower node. Meanwhile, in the case that an upper node (e.g., 71) have at least one child node, a DRP function of the upper node (e.g., 71) may be activated for connection (or attachment) of the at least one child node (i.e., corresponding lower nodes, for example, nodes 711, 712, 713 and/or 714). Since a DRP function of an upper node has a function able to identify a node connection (or node attachment) of the corresponding lower layer, the upper node may transmit a command to each lower node.

The DRP function in accordance with the present embodiment may be different from a DIP function for interworking of a legacy device ("d" of FIG. 2). That is, the DIP is a function for merely interworking with a legacy device (d type), of which the function is restrictive. The DIP interworking method may be different according to the characteristic of the legacy device (d type). In addition, since functions capable of being used by the interworking are limited, all functions that can be provided in the legacy device (d type) may not be used. On the other hand, as shown in FIG. 4, an M2M device (e.g., 430) having a heterogeneous (i.e., unsupported) area network interface (e.g., 431) may interwork with an M2M gateway (e.g., 400), through another M2M device (e.g., 420) having a plurality of area network interface functions (especially, network interface 422 compatible with a heterogeneous area interface (e.g., 431)). In this case, the DRP may be employed. In other words, another M2M device (e.g., 420) may perform a connection relay between the M2M device (e.g., 430) having a heterogeneous area network interface (e.g., 431) and the M2M gateway (e.g., 400), by using the DRP function.

Each M2M device may have the same structure for processing a DRP function as shown in FIG. 5. In addition, in the present embodiment, an M2M device (e.g., 430) having a heterogeneous area network interface (e.g., 431) may use all of its own functions (e.g., control, data transmission and reception, etc.) through a DRP function of another M2M device (e.g., 420). In summary, an M2M device (e.g., 430) having a heterogeneous area network interface (e.g., 431) may interwork with an M2M gateway (e.g., 400) through another M2M device (e.g., 420). In this case, the M2M device (e.g., 430) having a heterogeneous area network interface (e.g., 431) may use its all functions.

As shown in FIG. 4, a network topology of M2M gateway 400, D' device 420, and D" device 430 may appear to be similar to a general network architecture or a tethering structure through a gateway. However, as shown in FIG. 7, an M2M network may be constructed in a tree structure different from a tethering structure. In addition, D' device 420 may not be required to have all of GSCL functions for operating as a gateway. In the present embodiment, an NA of network/application domain 110 may control functions (e.g., DRP function 423) and/or operation of D' device 420, through a command. In this regard, device connection structure using a DRP function according to the present embodiment may be different from a typical tethering structure.

As described above, FIG. 6 illustrates a device registration (i.e., attachment) procedure for a relay connection according to a DRP function of an M2M device. In contrast, in an M2M network as shown in FIG. 7, an M2M device that need not be relayed any more may be present. In this case, a procedure of detaching the corresponding M2M device from the M2M network may be required. In particular, a network topology may be required to be reconfigured in order to prevent the occurrence of problems in the overall network architecture. Such device detachment procedure (i.e., a device disconnection procedure) will be described in detail with reference to FIG. 7 and FIG. 8.

Figure 8:
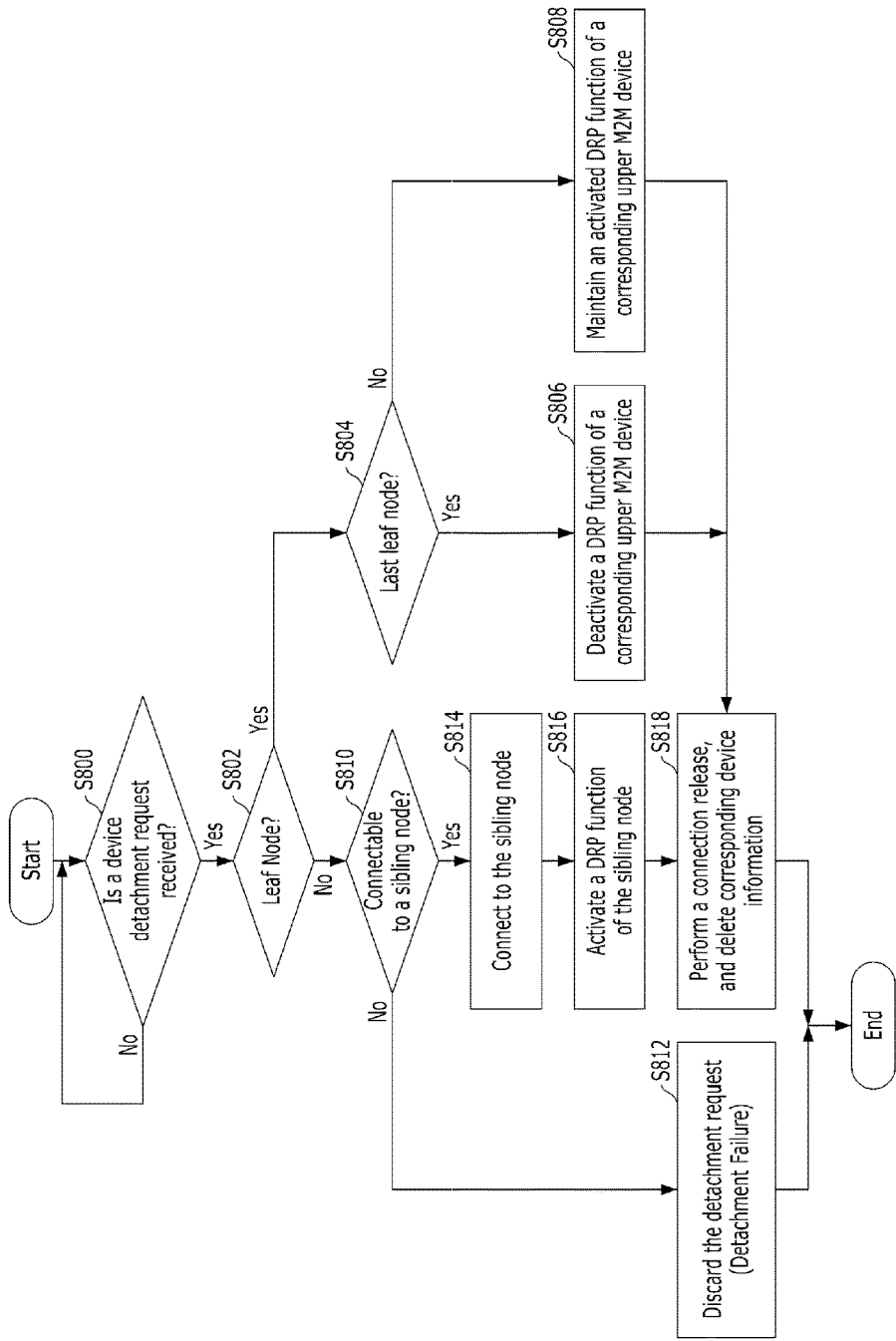
FIG. 8 is a flowchart illustrating a method of detaching an M2M device from an M2M area network in accordance with at least one embodiment.

FIG. 8 is a flowchart illustrating a method of detaching an M2M device from an M2M area network in accordance with at least one embodiment. That is, in the case that a relay for a certain M2M device is excluded in a DRP function of an upper M2M device, a procedure of detaching the certain M2M device from an M2M network may be performed as shown in FIG. 8.

In an M2M area network, a node (e.g. M2M device) may be detached (or disconnected) from a corresponding network architecture because a relay for the corresponding node through a DRP function of an upper node is not needed any more, or may be detached for other reasons. In the hierarchical structure as shown in FIG. 7, nodes (e.g., 7, 71 and 711) having a DRP function may receive a detachment request from at least one of relayed lower nodes. In this case, upper nodes receiving the detachment request may perform a node detachment procedure as shown in FIG. 8.

At step S800, an upper node (e.g., node 711) may monitor whether a detachment request (which may be referred to as "a disconnection request") is received from at least one corresponding lower node. Hereinafter, the at least one corresponding lower node may be referred to as "a detachment request node."

At step S802, when the detachment request is received from a specific lower node (i.e., detachment request node) (Yes—S800), the upper node (e.g., node 711) may determine (or check) whether the specific lower node (i.e., detachment request node) is a leaf node. Such determination (or check) may be performed in area network setting unit 514 of the upper node (e.g., node 711). As shown in FIG. 7, the leaf node may refer to nodes 72, 73, 712, 713, 714, 7111, 7112 and 7113 which have no lower nodes (i.e., child nodes).

At step S804, when the specific lower node (i.e., detachment request node) is the leaf node (Yes—S802), the upper node (e.g., node 711) may determine whether the specific lower node (i.e., detachment request node) is the last leaf node. In other words, the upper node (e.g., node 711) may determine whether the specific lower node (i.e., detachment request node) corresponding to the leaf node has a sibling node.

At step S806, when the specific lower node (i.e., detachment request node) is the last leaf node (Yes—S804), the upper node may deactivate a corresponding DRP function. For example, it may be assumed that (i) a certain node (e.g., 711) has a DRP function, (ii) lower nodes (e.g., 7111, 7112 and 7113) of the certain node (e.g., 711) are leaf nodes, (iii) node 7112 and node 7113 ("sibling nodes" of node 7111) have already been detached, i.e., (iv) node 7111 (i.e., detachment request node) is connected (or attached) to node 711. In this case, when node 7111 transmits a detachment request to node 711, node 7111 may correspond to the last leaf node connected to a corresponding upper node (e.g., node 711). In this case, area network setting unit 514 of device 711 may deactivate the DRP function. Thereafter, at step S818, the upper node (e.g., node 711) may release a connection to node 7111 (i.e., detachment request node), and delete device information associated with node 7111 (i.e., detachment request node), in connection state storage unit 516. Accordingly, the disconnected node 7111 (i.e., detachment request node) may not interwork with M2M gateway 400.

At step S808, when the specific lower node (i.e., detachment request node) is not the last leaf node (No—S804), the upper node (e.g., node 711) may maintain the DRP function in an active state. Thereafter, at step S818, the upper node may release a connection to device 7112 and delete device information associated with the specific lower node 7111 (i.e., detachment request node). For example, it may be assumed that (i) nodes 7111, 7112 and 7113 are leaf nodes of node 711 having a DRP function, (ii) node 7113 has already been detached, (iii) node 7111 and node 7112 ("sibling nodes" of node 7111) are connected to node 711, and (iv) node 7111 transmits a detachment request. In this case, node 7111 (i.e., detachment request node) is not the last leaf node attached to corresponding upper node (e.g., 711) because a sibling node 7112 sharing the same node 711 is present. Therefore, area network setting unit 514 of the upper node (e.g., node 711) may release a connection to node 7111 (i.e., detachment request node), and delete device information associated with node 7111 (i.e., detachment request node), in connection state storage unit 516. Accordingly, the disconnected node 7111 (i.e., detachment request node) may not interwork with M2M gateway 400.

Referring back to FIG. 8, at step S802, the specific lower node (i.e., detachment request node) may not be the leaf node (No—S802). For example, as shown in FIG. 7, node 71 having a DRP function may receive a detachment request from node 711 (lower device that is not the leaf node) among corresponding lower devices (e.g., 711, 712, 713 and 714). In this case, lower nodes 7111 through 7113 are connected (or attached) to node 711 (i.e., detachment request node) that is not the leaf node. If node 711 (i.e., detachment request node) is disconnected (or detached) from upper node 71, corresponding lower nodes (nodes 7111 through 7113) of node 711 (i.e., detachment request node) cannot communicate with M2M gateway 400. Therefore, in this case, the following procedure may be required to be performed, before disconnecting (or detaching) node 711 (i.e., detachment request node).

More specifically, at step S810, when the specific lower node (i.e., detachment request node) is not the leaf node (No—S802), upper node (i.e., node having received a detachment request) 71 (more specifically, area network setting unit 514 of node 71) may determine whether the specific lower node 711 (i.e., detachment request node) is connectable to a sibling node. In other words, upper node 71 (i.e., node having received the detachment request) may determine whether a sibling node having a DRP function is present among corresponding sibling nodes (i.e., lower nodes sharing the same node 71) (e.g., 712, 713 and 714) of the specific lower node (i.e., detachment request node).

At step S812, when the sibling node having the DRP function is not present among sibling nodes 712, 713 and 714 of node 711 (No—S810), upper node 71 may discard the detachment request of node 711 (i.e., detachment request node). In this case, detachment procedure may not be performed. In other embodiments, upper node 71 may release a connection of node 711 according to the detachment request of node 711 (i.e., detachment request node). In this case, lower nodes (e.g., 7111, 7112 and 7113) of node 711 (i.e., detachment request node) may be disconnected. Accordingly, upper node 71 may transmit a notification to at least one of (i) user equipment, (ii) an M2M network operator server, and (iii) an M2M service provider server, through M2M core 112 (e.g., a central server) in an alarm form. Herein, the notification may include information on lower nodes (e.g., 7111, 7112 and 7113). After receiving a disconnection confirmation from at least one of (i) user equipment, (ii) an M2M network operator server, and (iii) an M2M service provider server, upper node 71 may release a connection to node 711 (i.e., detachment request node).

At step S814, when the sibling node having an DRP function is present among sibling nodes 712, 713 and 714 of node 711 (i.e., detachment request node) (Yes—S810), node 71 may connect lower nodes 7111 through 7113 to the sibling node having the DRP function. For example, when node 712 is a sibling node having a DRP function, area network setting unit 514 of node 71 may connect corresponding lower nodes 7111 through 7113 to sibling node 712 having the DRP function. In other embodiments, the detachment request node (e.g., node 711) may perform operation S814.

At step S816, area network setting unit 514 of node 71 may make a request to activate the DRP function of node 712 corresponding to the sibling node. In other embodiments, the detachment request node (e.g., node 711) may perform operation S816.

At step S818, upper node 71 may release a connection of node 711 (i.e., detachment request node) such that lower nodes (e.g., 7111, 7112 and 7113) of node 711 can maintain the interworking with M2M gateway 400 through device 712. In this case, area network setting unit 514 of node 71 may release a connection setting associated with node 711 (i.e., detachment request node) by deactivating a DRP function associated with node 711 (i.e., detachment request node). Furthermore, node 71 may not interwork with M2M gateway 400 by deleting corresponding device information on node 711 (i.e., detachment request node) in connection state storage unit 516. In other embodiments, the detachment request node (e.g., node 711) may perform operation S818.

Furthermore, node 711 (i.e., detachment request node) may transmit, to node 712, corresponding device information on nodes 7111, 7112 and 7113 which is stored in connection state storage unit 516, such that lower nodes 7111, 7112 and 7113 of node 711 can interwork with M2M gateway 400 through node 712. Therefore, the DRP function of device 712 may perform a relay connection process for lower nodes 7111, 7112 and 7113. In accordance with another embodiment, each of nodes 7111, 7112 and 7113 may be attached to node 712 by performing a device attachment method of FIG. 6. In this case, the DRP function of node 712 may perform a relay connection process for lower nodes 7111, 7112 and 7113.

In other embodiments, a device detachment method shown in FIG. 8 may be performed in a device management server or a network management server.

In accordance with the present embodiment, when an interface of a new M2M device is not supported by an M2M gateway, the M2M new device may interwork with the M2M gateway by using various interfaces of other M2M devices. That is, the present embodiment may establish an M2M network architecture capable of interworking between various heterogeneous M2M devices (i.e., M2M devices to which new different network technologies and interfaces are applied) through an existing M2M gateway.

The present embodiment may establish an M2M area network architecture for data communication between M2M devices in device to device (D2D) form. Therefore, in accordance with the present embodiment, new M2M devices (i.e., M2M devices to which a new area network technology and an interface are applied) may also easily interwork with an existing M2M gateway. Accordingly, an additional installation of separate M2M gateways for interworking of the new M2M devices may not be required, thereby minimizing involvement of an additional cost.

The present embodiment may establish a network architecture using heterogeneous M2M devices in such a manner that a new M2M device having a new network interface different from an M2M gateway is attached to an M2M device having a plurality of typical M2M area network interfaces in a D2D form. Furthermore, in accordance with the present embodiment, a network architecture for heterogeneous M2M devices may be constructed using a device replay proxy (DRP). Herein, the DRP may represent minimum functions required for providing a network connection to a lower M2M device, through an M2M device (i.e., upper M2M device) having a plurality of M2M area network interface functions.

In other embodiments, heterogeneous device management apparatus 50 may be implemented as a separate server in an M2M network. In this case, operations (e.g., FIG. 6, FIG. 8), functions, and constituent elements (e.g., FIG. 5A and FIG. 5B) described above in connection with a device attachment and/or a device detachment may be applied to the server.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of performing a device attachment in a first machine to machine (M2M) device to be attached to an M2M area network, the method comprising:
   transmitting, by the first M2M device, a first attachment request to an M2M gateway of the M2M area network;
   when the first M2M device fails to connect directly to the M2M gateway, searching for second M2M devices which are different from the first M2M device, capable of supporting a network interface of the first M2M device and supporting the M2M gateway, and located in the M2M area network;
   transmitting a second attachment request to one of the searched second M2M devices;
   performing a connection between the first M2M device and the one of the searched second M2M devices; and
   performing a communication between the first M2M device and the M2M gateway, through the connected second M2M device,
   wherein the searching includes:
   receiving network interface information which is broadcast from the second M2M devices included in the M2M area network; and
   determining whether each one of the second M2M devices is capable of supporting the network interface of the first M2M based on the received network interface information and capable of supporting the M2M gateway, and detecting one supporting the network of the first M2M device and supporting the M2M gateway from the second M2M devices based on the determination result.

2. The method of claim 1, wherein the network interface information is received through beacon signals transmitted by the second M2M devices.

3. The method of claim 1, wherein the communication between the first M2M device and the M2M gateway is performed through an activated device relay proxy (DRP) function of the connected second M2M device.

4. The method of claim 3, wherein the connected second M2M device includes:
  a first network interface capable of interworking with the network interface of the first M2M device; and
  a second network interface capable of interworking with a network interface of the gateway M2M device.

5. The method of claim 1, wherein the performing the connection includes:
  transmitting device information associated with the first M2M device, to the one of the searched second M2M devices.

6. A method of performing a device attachment in a second machine to machine (M2M) relay device coupled to an M2M gateway, in an M2M area network, the method comprising:
  broadcasting network interface information of the second M2M device;
  receiving an attachment request from a first M2M device which has failed to connect directly to the M2M gateway, wherein (i) the M2M gateway does not support a network interface of the first M2M device, and (ii) the first M2M device is configured to determine a target M2M device capable of supporting the network interface of the first M2M device and the M2M gateway, based on network interface information received from the second M2M device included in the M2M area network;
  performing a device to device (D2D) connection between the second M2M device and the first M2M device when the first M2M device is capable of supporting the network interface of the first M2M device and the M2M gateway; and
  performing an interface connection (i) between the second M2M device and the new M2M device and (ii) between the second M2M network and the M2M gateway.

7. The method of claim 6, wherein the broadcasting includes:
  broadcasting the network interface information through a beacon signal.

8. The method of claim 6, wherein the network interface information includes information on at least one of:
  a first network interface capable of interworking with the network interface of the first M2M device; and
  a second network interface capable of interworking with a network interface of the gateway M2M device.

9. The method of claim 6, further comprising:
  receiving device information from the new M2M device.

10. The method of claim 6, wherein the performing the interface connection includes:
  activating a device relay proxy (DRP) function.

11. The method of claim 6, wherein the M2M relay device is (i) coupled directly to the M2M gateway or (ii) coupled to the M2M gateway through a third M2M relay device.

* * * * *